United States Patent
Kawachi

(10) Patent No.: US 8,013,723 B2
(45) Date of Patent: Sep. 6, 2011

(54) VEHICLE METER DISPLAY SYSTEM AND METHOD FOR CONTROLLING THE SAME

(75) Inventor: Kazuhiro Kawachi, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 776 days.

(21) Appl. No.: 12/073,778

(22) Filed: Mar. 10, 2008

(65) Prior Publication Data

US 2008/0224840 A1 Sep. 18, 2008

(30) Foreign Application Priority Data

Mar. 12, 2007 (JP) ................. 2007-062410

(51) Int. Cl.
*B60Q 1/00* (2006.01)

(52) U.S. Cl. ........ 340/438; 340/435; 340/461; 340/462; 348/148

(58) Field of Classification Search .................. 340/435, 340/461, 462; 348/148
See application file for complete search history.

(56) References Cited

U.S. PATENT DOCUMENTS

| 5,691,695 A * | 11/1997 | Lahiff ........................... 340/461 |
| 7,679,495 B2 * | 3/2010 | Beutnagel-Buchner et al. ............................. 340/435 |

FOREIGN PATENT DOCUMENTS

| DE | 197 44 382 | 4/1998 |
| DE | 10 2004 038 916 A1 | 3/2005 |
| DE | 103 53 462 | 6/2005 |
| JP | A-62-178444 | 8/1987 |
| JP | A-04-015131 | 1/1992 |
| JP | A-04-314631 | 11/1992 |
| JP | A-2004-189194 | 7/2004 |
| WO | WO 98/03366 A1 | 1/1998 |

* cited by examiner

*Primary Examiner* — Brian Zimmerman
*Assistant Examiner* — Kaleria Knox
(74) *Attorney, Agent, or Firm* — Oliff & Berridge, PLC

(57) ABSTRACT

A vehicle meter display system that displays vehicle information including important information includes: a steering wheel that has at least one opening formed between spokes; a meter display unit disposed at a position closer to the front of the vehicle than the steering wheel; a steering angle detection unit that detects the steering angle of the steering wheel; and a meter display control unit that changes the manner in which an important information display area is displayed based on the steering angle detected by the steering angle detection unit so that a diver is able to see the important information through the at least one opening.

11 Claims, 12 Drawing Sheets

VEHICLE METER DISPLAY SYSTEM AND METHOD FOR CONTROLLING THE SAME

INCORPORATION BY REFERENCE

The disclosure of Japanese Patent Application No. 2007-062410 filed on Mar. 12, 2007, including the specification, drawings and abstract is incorporated herein by reference in its entirety.

BACKGROUND OF THE INVENTION

1. Field of the Invention

The invention relates generally to a vehicle meter display system and a method for controlling the vehicle meter display system. More specifically, the invention relates to a vehicle meter display system that appropriately displays vehicle information, including important information, and relates to a method for controlling the vehicle meter display system.

2. Description of the Related Art

A steering wheel for a vehicle, such as an automobile, includes a rim held by a driver, a boss connected to a steering shaft, and a plurality of spokes. The spokes connect the rim to the boss, and openings are formed between the spokes. A meter display unit that displays the vehicle information is provided at a position closer to the front of the vehicle than the steering wheel. The driver usually sees the vehicle information displayed on the meter display unit through the openings of the steering wheel.

Some meter display units include a liquid crystal display. The vehicle information displayed on the meter display unit includes a vehicle speed, an engine speed, a coolant temperature, and warning information issued to the driver. The warning information and the vehicle speed information are regarded as "important information" among all types of vehicle information. The warning information is necessary for the driver to avoid dangers such as a vehicle collision. The vehicle speed information is necessary for the driver to drive the vehicle in compliance with the traffic regulations. Therefore, the important information needs to be displayed in a manner such that the driver can always see it while driving.

The driver operates the steering wheel, that is, turns the steering wheel. When the steering angle, that is, the turning angle, of the steering wheel is increased, the spokes of the steering wheel may overlap the location at which the important information is displayed and therefore obstruct the driver's view of the important information. When the driver is driving through a highway interchange, the steering angle of the steering wheel is increased. When driving through the highway interchange, the driver needs to drive the vehicle while maintaining a large steering angle of the steering wheel for a relatively long time. In this case, if the spokes of the steering wheel overlap the location at which the important information is displayed and therefore obstruct the driver's view of the important information, the driver is unable to see the important information through the openings of the steering wheel.

Related art concerning a meter display unit that includes a liquid crystal display is described in, for example, Japanese Patent Application Publication No. 4-15131 (JP-A-4-15131). According to JP-A-4-15131, the location of a meter displayed on the liquid crystal is adjusted in the vehicle-height direction based on the tilt angle of the steering wheel. However, the related art described in JP-A-415131 is not intended to make it easier for the driver to see the important information when the driver turns the steering wheel. Therefore, under the related art, there is a possibility that the driver is not able to see the important information displayed on the meter display unit. This is because when the steering angle of the steering wheel is increased, the spokes may overlap the location at which the important information is displayed and therefore obstruct the driver's view of the important information.

SUMMARY OF THE INVENTION

The invention provides a vehicle meter display system with which spokes do not obstruct the driver's view of important information displayed on a meter display unit even when the steering angle of a steering wheel is increased, and which allows a driver to always see the important information through at least one opening of the steering wheel. The invention also provides a method for controlling the vehicle meter display system.

A first aspect of the invention relates to a vehicle meter display system that displays vehicle information including important information. The vehicle meter display system includes: a steering wheel that includes a rim, a boss connected to a steering shaft, and multiple spokes which connect the rim to the boss, and that has at least one opening formed between the spokes; a meter display unit disposed at a position closer to the front of the vehicle than the steering wheel; a steering angle detection unit that detects the steering angle of the steering wheel; and a meter display control unit that changes the manner in which an important information display area is displayed based on the steering angle detected by the steering angle detection unit so that a diver is able to see the important information through the at least one opening.

In the vehicle meter display system according to the first aspect of the invention, the meter display control unit changes the manner in which the important information display area is displayed based on the steering angle detected by the steering angle detection unit so that the diver is able to see the important information through the at least one opening. Therefore, even when the steering angle of the steering wheel is increased, the spokes do not obstruct the driver's view of the important information displayed on the meter display unit. Accordingly, the driver is always able to see the important information through the at least one opening of the steering wheel.

When the meter display control unit changes the area of the important information display area, the meter display control unit may reduce the number of objects of the important information displayed on the meter display unit as the steering angle is increased.

A second aspect of the invention relates to a method for controlling a vehicle meter display system including: a steering wheel that includes a rim, a boss connected to a steering shaft, and multiple spokes which connect the rim to the boss, and that has at least one opening formed between the spokes; and a meter display unit disposed at a position closer to the front of the vehicle than the steering wheel. According to the method, the steering angle of the steering wheel is detected, and the manner in which an important information display area is displayed is changed based on the steering angle so that a diver is able to see the important information through the at least one opening.

According to the invention, there is provided a vehicle meter display system with which spokes do not obstruct the driver's view of important information displayed on a meter display unit even when the steering angle of a steering wheel is increased, and which allows a driver to always see the important information through at least one opening of the steering wheel. The invention also provides a method for controlling the vehicle meter display system.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

First Embodiment of the Invention

Figure 1:
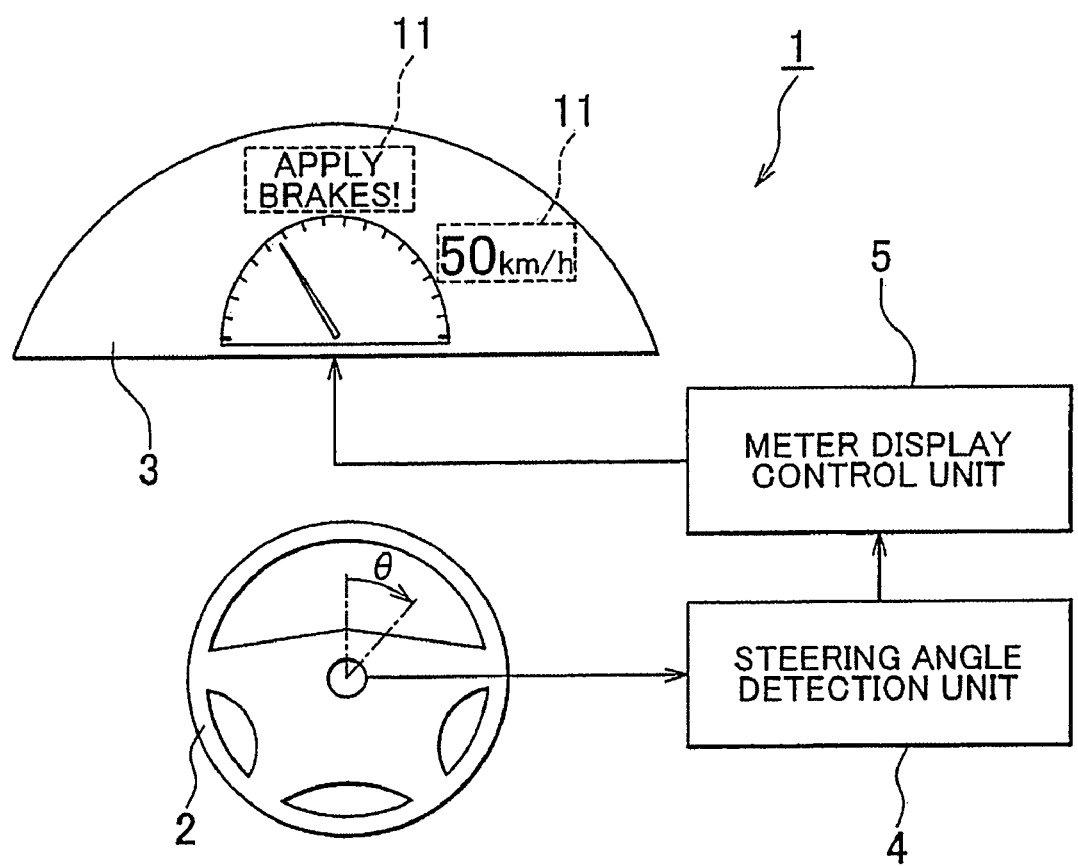
FIG. 1 is a block diagram showing the configuration of a vehicle meter display system according to a first embodiment of the invention.
Figure 2:
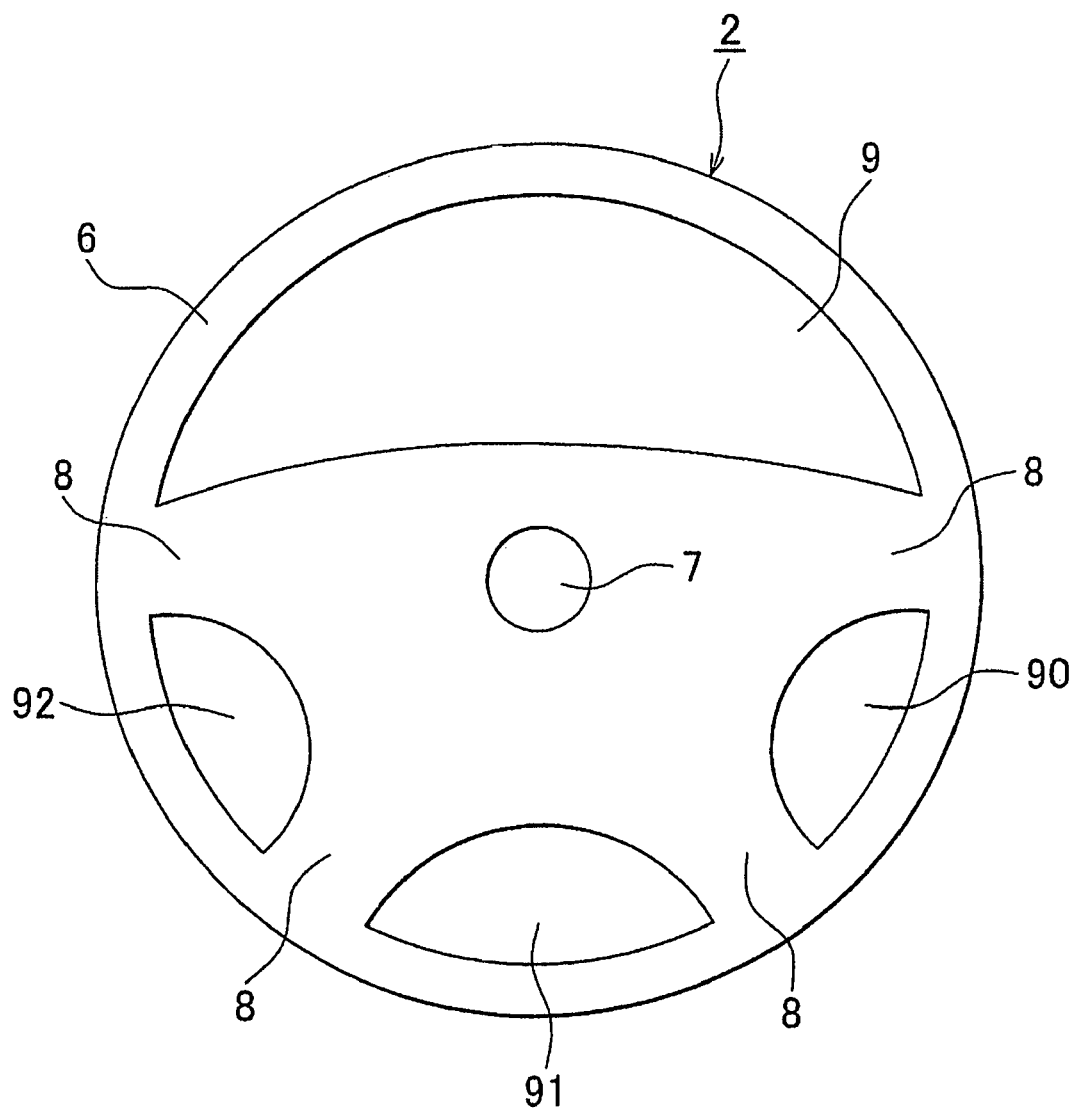
FIG. 2 is a view showing the configuration of a steering wheel included in the vehicle meter display system according to the first embodiment of the invention.

A first embodiment of the invention will be described with reference to the attached drawings. FIG. 1 is a block diagram showing the configuration of a vehicle meter display system 1 according to the first embodiment of the invention. FIG. 2 is a view showing the configuration of a steering wheel 2 included in the vehicle meter display system 1. As shown in FIG. 1, the vehicle meter display system 1 according to the first embodiment of the invention appropriately displays vehicle information, including important information, and includes the steering wheel 2, a meter display unit 3, a steering angle detection unit 4, and a meter display control unit 5.

As shown in FIG. 2, the steering wheel 2 includes a rim 6 held by a driver, a boss 7 connected to a steering shaft (not shown), and multiple spokes 8 that connect the rim 6 to the boss 7. Further, openings 9, 90, 91 and 92 are formed between the spokes 8.

The meter display unit 3 that displays the vehicle information, including the important information, is disposed at a position closer to the front of the vehicle than the steering wheel 2. The meter display unit 3 is configured so that the important information is displayed at a desired location and in a desired size based on a control signal from the meter display control unit 5. The meter display unit 3 includes, for example, a liquid crystal display. The meter display unit 3 is disposed in such a manner that, when the steering angle θ of the steering wheel 2 is 0° (i.e. when the vehicle is traveling straight), the driver can see the entire screen of the meter display unit 3 through the opening 9, which is the largest opening of all the openings of the steering wheel 2. As shown in FIG. 1, the meter display unit 3 has a display area 11 in which the important information is displayed (hereinafter, referred to as "important information display area 11") on the screen. The types of the important information are not particularly limited, and examples of the important information include warning information issued to the driver and vehicle speed information. Further, examples of the warning information include text information, such as: "APPLY BRAKES!", "VEHICLE IS APPROACHING OBLIQUELY FROM REAR RIGHT!", "VEHICLE IS APPROACHING OBLIQUELY FROM REAR LEFT!", and "THERE IS PERSON BEHIND VEHICLE!". The meter display unit 3 may display multiple types of the important information (see FIG. 1) at the same time, or may display only one type of the important information at one time.

The steering angle detection unit 4 detects the steering angle θ of the steering wheel 2. The steering angle θ when the vehicle is traveling straight is represented as 0°. The steering angle θ that is achieved when the driver turns the steering wheel 2 clockwise from the position at which the steering angle θ is 0° is represented by a positive value. On the other hand, the steering angle θ that is achieved when the driver turns the steering wheel 2 counterclockwise from the position at which the steering angle θ is 0° is represented by a negative value. It should be noted that the term "steering angle" in the invention means the absolute value of a steering angle θ. Further, in the description below, "the steering angle θ is increased" and "the steering angle θ is decreased" mean that "the absolute value of the steering angle θ is increased" and "the absolute value of the steering angle θ is decreased", respectively.

The meter display control unit 5 moves the important information display area 11 to an appropriate location based on the steering angle θ detected by the steering angle detection unit 4 so that the driver can see the important information through the opening 9. The meter display control unit 5 includes a CPU, a RAM, a ROM, and the like (all of which are not shown in the drawings).

Figure 3:
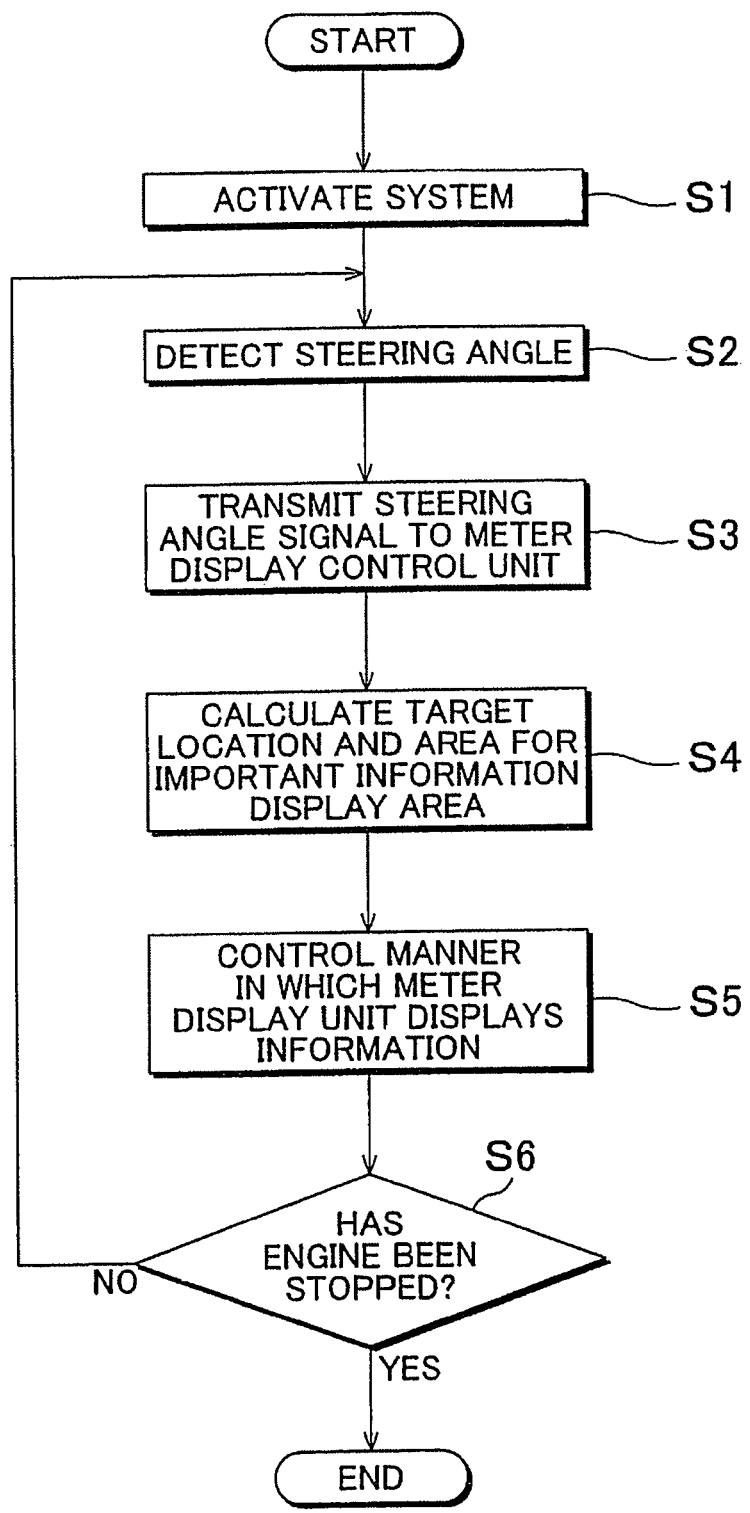
FIG. 3 is a flowchart showing the operation of the vehicle meter display system according to the first embodiment of the invention.

The operation of the vehicle meter display system 1 according to the first embodiment of the invention will be described below. FIG. 3 is a flowchart showing the operation of the vehicle meter display system 1 according to the first embodiment of the invention.

When an engine is started, the vehicle meter display system 1 is activated (in step S1). Next, when the driver turns the steering wheel 2, the steering angle detection unit 4 detects the steering angle θ (in step S2). The steering angle detection unit 4 transmits a signal indicating the steering angle θ (hereinafter, referred to as "steering angle signal") to the meter display control unit 5 (in step S3).

The appropriate location and appropriate area of the important information display area 11 vary based on the steering angle θ of the steering wheel 2. If the important display area 11 is at the appropriate location and has the appropriate area, the driver can easily see the important information through the opening 9. Therefore, the meter display control unit 5 calculates the target location and target area of the important information display area 11 based on the steering angle signal from the steering angle detection unit 4 (in step S4). The meter display control unit 5 then controls the manner in which the meter display unit 3 displays the important information based on the calculated location and area (in step S5). Next, a sensor (not shown) determines whether the engine has been stopped (step S6). If it is determined that the engine is still operating (NO), the process returns to step S2. On the other hand, if it is detected that the engine has been stopped (YES), the vehicle meter display system 1 ends the current routine.

Figure 4:
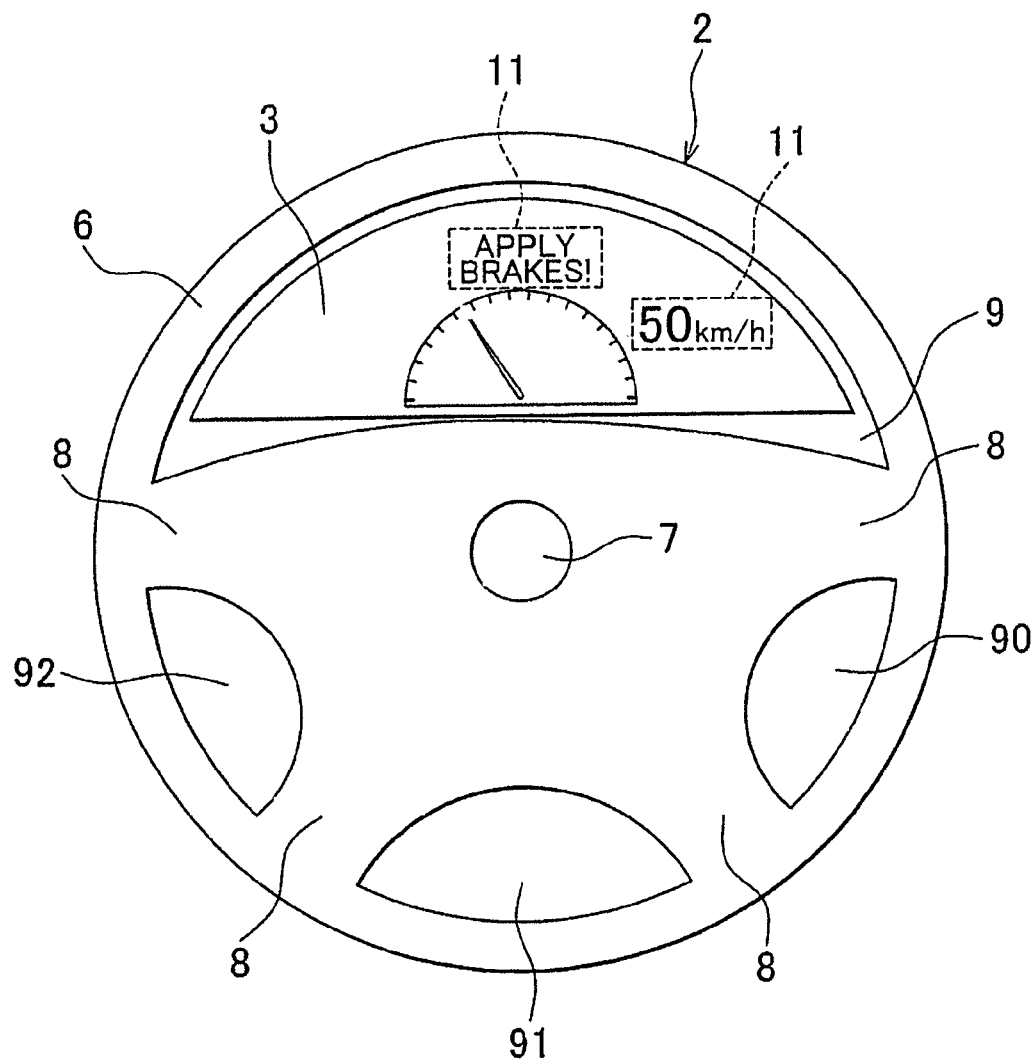
FIG. 4 is a view showing an example of a manner in which a meter display unit according to the first embodiment of the invention displays important information when the steering angle of a steering wheel is 0°.
Figure 5:
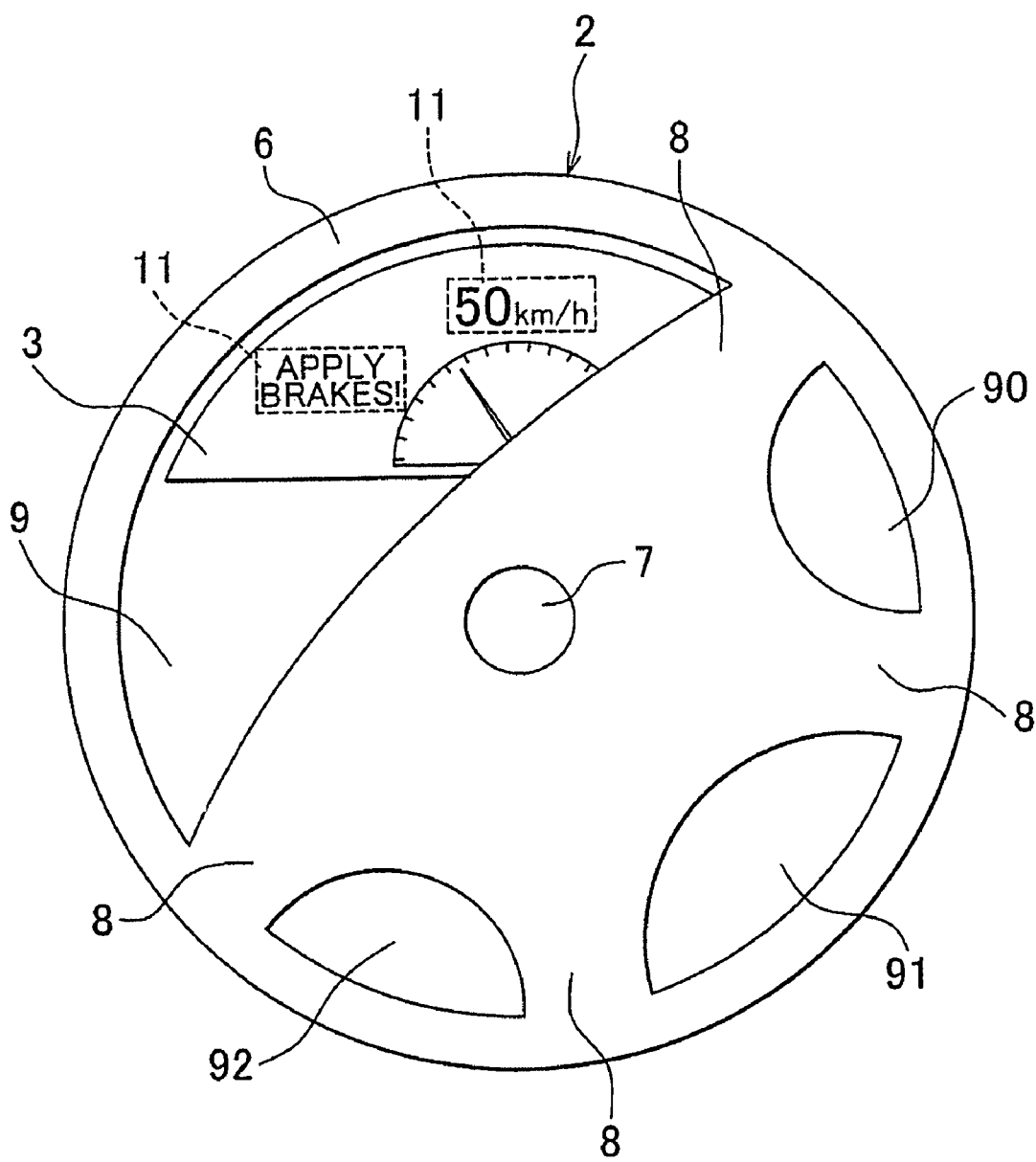
FIG. 5 is a view showing an example of the manner in which the meter display unit according to the first embodiment of the invention displays the important information when the steering angle of the steering wheel is −45°.
Figure 6:
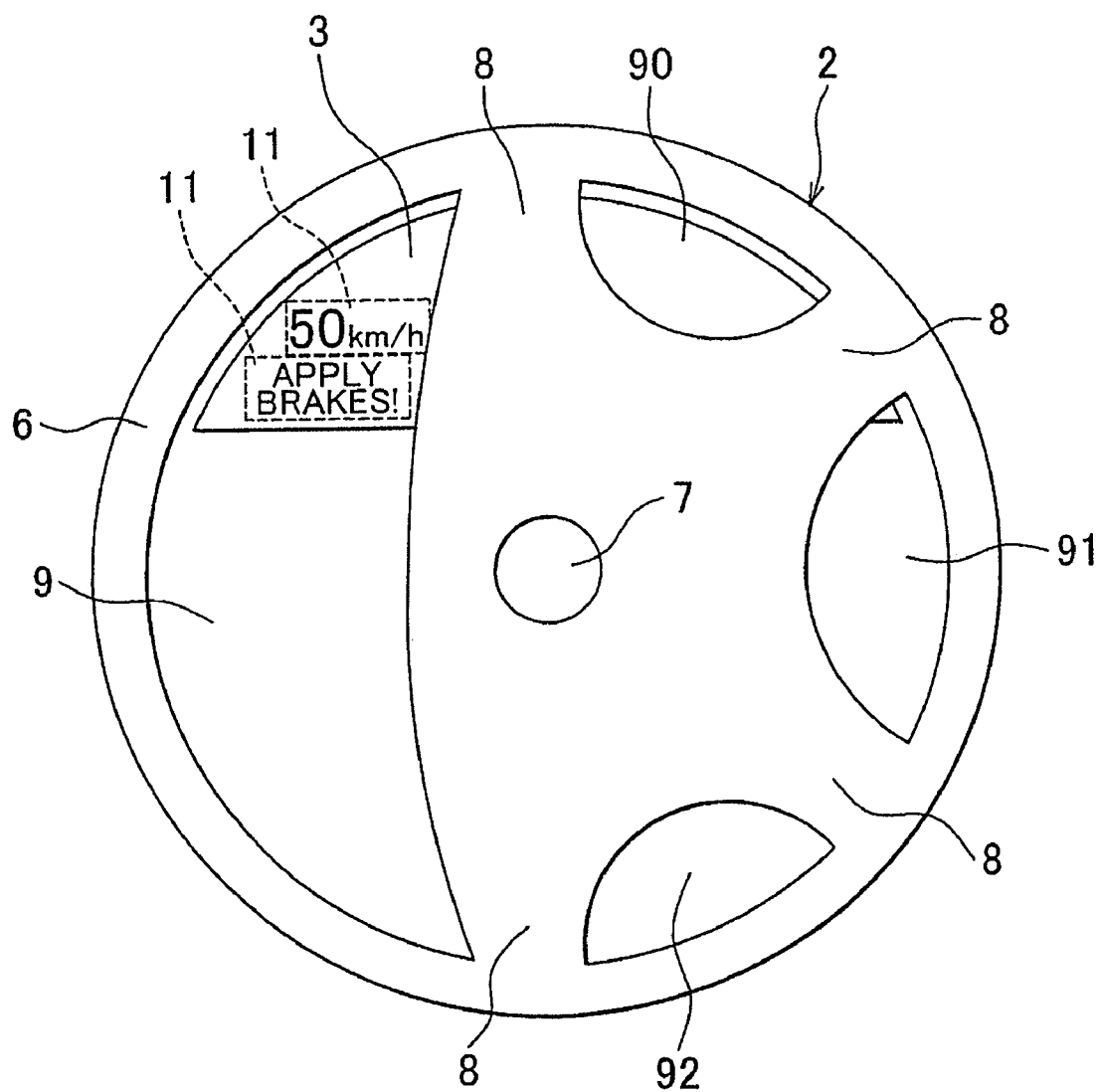
FIG. 6 is a view showing an example of the manner in which the meter display unit according to the first embodiment of the invention displays the important information when the steering angle of the steering wheel is −90°.

Next, examples of a manner in which the meter display unit 3 displays the important information will be described. FIG. 4 is a view showing an example of a manner in which the meter display unit 3 according to the first embodiment of the invention displays the important information when the steering angle of the steering wheel is 0°. FIG. 5 is a view showing an example of the manner in which the meter display unit according to the first embodiment of the invention displays the important information when the steering angle of the steering wheel is −45°. FIG. 6 is a view showing an example of the manner in which the meter display unit according to the first embodiment of the invention displays the important information when the steering angle of the steering wheel is −90°.

As shown in FIG. 4, when the steering angle θ is 0°, the meter display unit 3 displays the important information in a manner suitable for the mode in which the vehicle is traveling straight (hereinafter referred to as "straight mode"). In the straight mode, the important information display area 11 is at the location at which the driver can see the important information through the opening 9 of the steering wheel 2 the steering angle θ of which is currently 0°.

As shown in FIGS. 5 and 6, when the driver turns the steering wheel 2 and therefore the steering angle θ becomes a positive value or a negative value (the steering angle θ is −45° in FIG. 5; the steering angle θ is −90° in FIG. 6), the meter display unit 3 displays the important information in a manner suitable for the mode in which the steering wheel 2 is steered (hereinafter referred to as "steering mode"). In the steering mode, the important information display area 11 is moved to an appropriate location on the screen of the meter display unit 3 so that the driver can see the important information through the opening 9 of the steering wheel 2 the steering angle 0° of which is currently a positive value or a negative value.

In the first embodiment of the invention, the steering wheel 2 has the multiple openings 9, 90, 91 and 92. The important information display area 11 may be displayed in a manner selected based on the steering angle θ so that the driver can see the important information displayed in the important information display area 11 through one or more openings from among the openings 9, 90, 91 and 92. More specific description will be provided below. As shown in FIGS. 5 and 6, the vehicle meter display system 1 may be configured to display the important information in such a manner that the driver can see all the objects of the important information (in FIGS. 5 and 6, "APPLY BRAKES!" and "50 km/h") through one of the openings 9, 90, 91 and 92 (the opening 9 in FIGS. 5 and 6).

Figure 7:
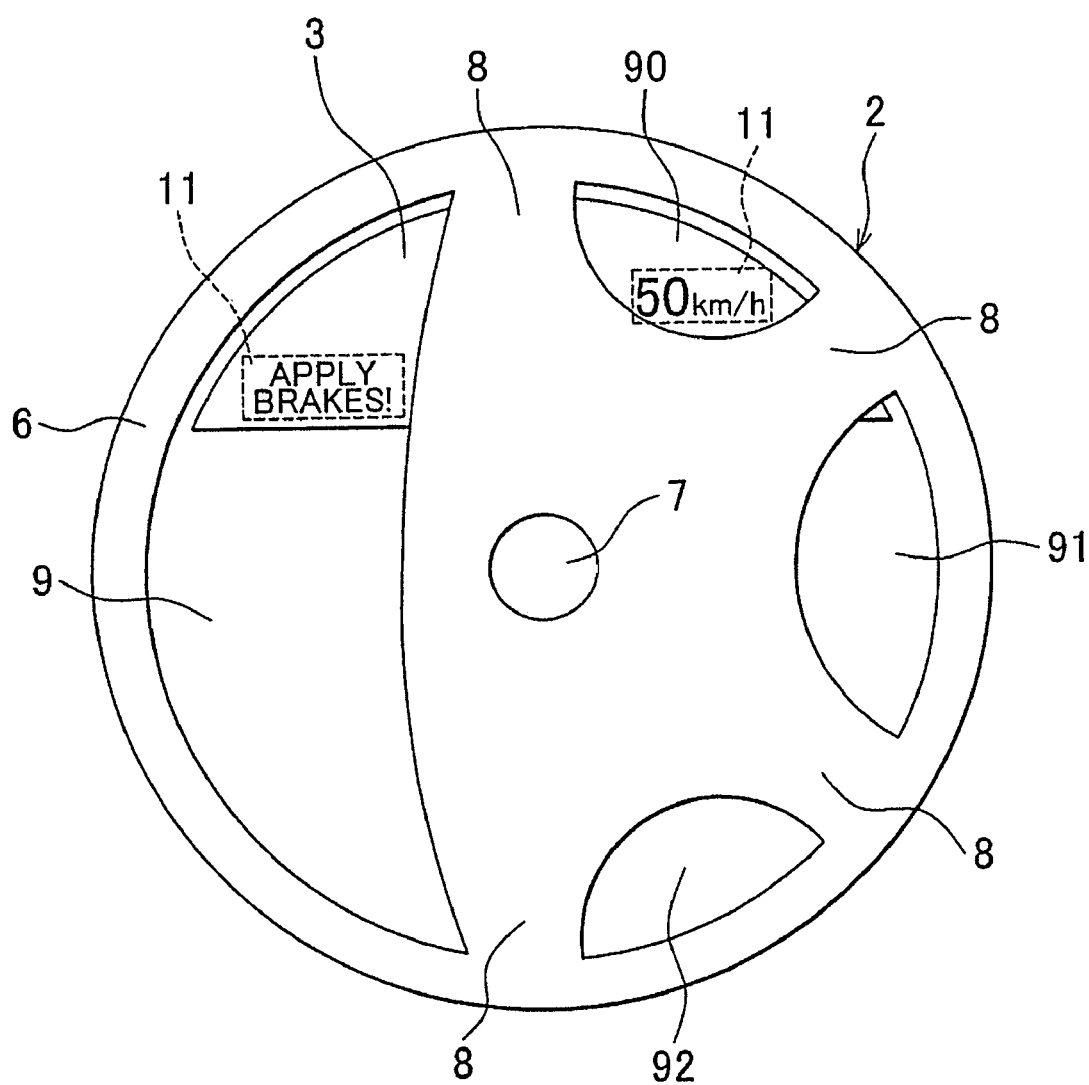
FIG. 7 is a view showing an example of another manner in which the meter display unit according to the first embodiment of the invention displays the important information when the steering angle of the steering wheel is −90°.

Alternatively, as shown in FIG. 7, the important information display area 11 may be divided into some segments and these segments are moved to appropriate locations so that the driver can see the objects of the important information (in FIG. 7, "APPLY BRAKES!" and "50 km/h") through separate openings (in FIG. 7, the objects can be seen through the openings 9 and 90). When the important information display area 11 is moved across the spoke 8, the important information display area 11 is moved instantaneously. Such instantaneous movement of the important information display area 11 does not reduce the ease in seeing the important information.

As described above, the vehicle meter display system 1 according to the first embodiment of the invention moves the important information display area 11 displayed on the meter display unit 3 based on the steering angle θ of the steering wheel 2. Therefore, even if the steering angle θ is changed, the spokes 8 do not obstruct the driver's view of the important information displayed on the meter display unit 3. This makes it possible for the driver to always see the important information, such as the warning information, through at least one of the openings 9, 90, 91 and 92 of the steering wheel 2. Accordingly, the driver can reliably obtain the important information, and drive the vehicle based on the obtained information.

Second Embodiment of the Invention

Figure 8:
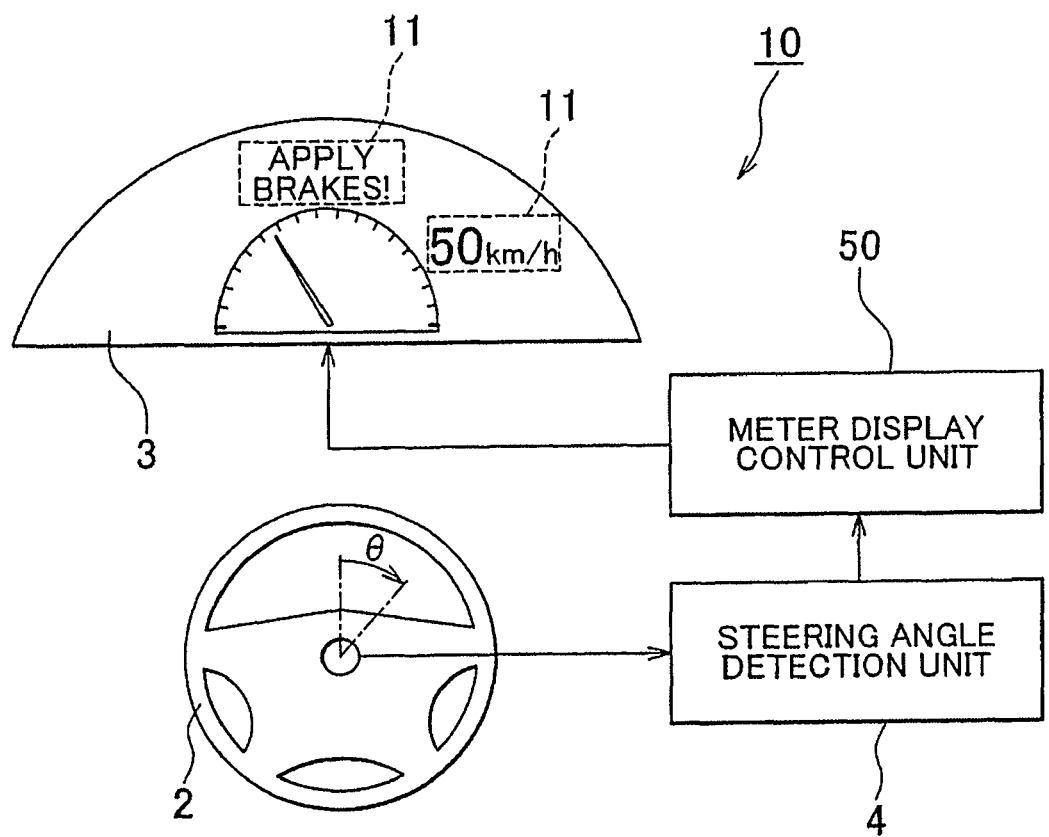
FIG. 8 is a block diagram showing the configuration of a vehicle meter display system according to a second embodiment of the invention.

A second embodiment of the invention will be described with reference to the attached drawings. FIG. 8 is a block diagram showing the configuration of a vehicle meter display system 10 according to the second embodiment of the invention. The elements in the second embodiment that are the same as those in the first embodiment will be denoted by the same reference numerals, and the descriptions thereof will be omitted.

The second embodiment differs from the first embodiment in that is a meter display control unit 50 is provided in place of the meter display control unit 5. Other elements in the configuration of the second embodiment are the same as those in the first embodiment.

The meter display control unit 50 adjusts the area of the important information display area 11 based on the steering angle θ detected by the steering angle detection unit 4 so that the driver can see the important information through the opening 9. More specifically, as the steering angle θ detected by the steering angle detection unit 4 increases, the meter display control unit 50 reduces the area of the important information display area 11 continuously or in a stepwise manner. Further, as the steering angle θ detected by the steering angle detection unit 4 decreases, the meter display control unit 50 increases the area of the important information display area 11 continuously or in a stepwise manner. As the steering angle θ increases, the meter display control unit 50 may reduce the number of objects of the important information displayed on the meter display unit 3 continuously or in a stepwise manner. Further, as the steering angle θ decreases, the meter display control unit 50 may increase the number of objects of the important information displayed on the meter display unit 3 continuously or in a stepwise manner. The meter display control unit 50 includes, for example, a CPU, a RAM, a ROM, and the like (all of which are not shown in the drawings).

Figure 9:
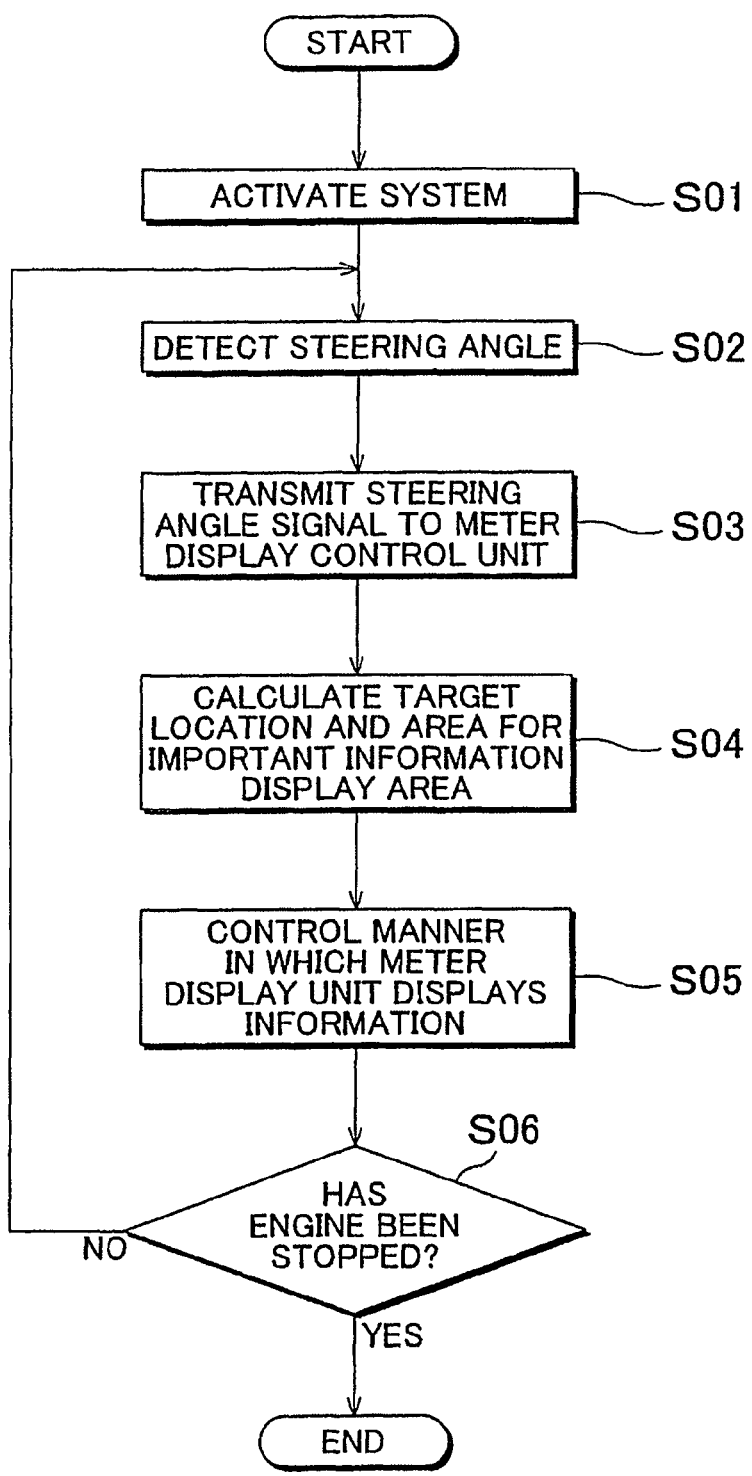
FIG. 9 is a flowchart showing the operation of the vehicle meter display system according to the second embodiment of the invention.

Next, the operation of the vehicle meter display system 10 according to the second embodiment of the invention will be described. FIG. 9 is a flowchart showing the operation of the vehicle meter display system 10 according to the second embodiment of the invention.

When the engine is started, the vehicle meter display system 10 is activated (in step S01). Next, when the driver turns the steering wheel 2, the steering angle detection unit 4 detects the steering angle θ (in step S02). The steering angle detection unit 4 transmits a signal indicating the steering angle θ (hereinafter, referred to as "steering angle signal") to the meter display control unit 50 (in step S03).

The appropriate location and appropriate area of the important information display area 11 vary based on the steering angle θ of the steering wheel 2. If the important display area 11 is at the appropriate location and has the appropriate area, the driver can easily see the important information through the opening 9. Therefore, the meter display control unit 50 calculates the target location and target area of the important information display area 11 based on the steering angle signal from the steering angle detection unit 4 (in step S04). The meter display control unit 50 then controls the manner in which the meter display unit 3 displays the important information based on the calculated location and area (in step S05). Next, a sensor (not shown) determines whether the engine has been stopped (step S06). If it is determined that the engine is still operating (NO), the process returns to step S2. On the other hand, if it is determined that the engine has been stopped (YES), the vehicle meter display system 10 ends the current routine.

Figure 10:
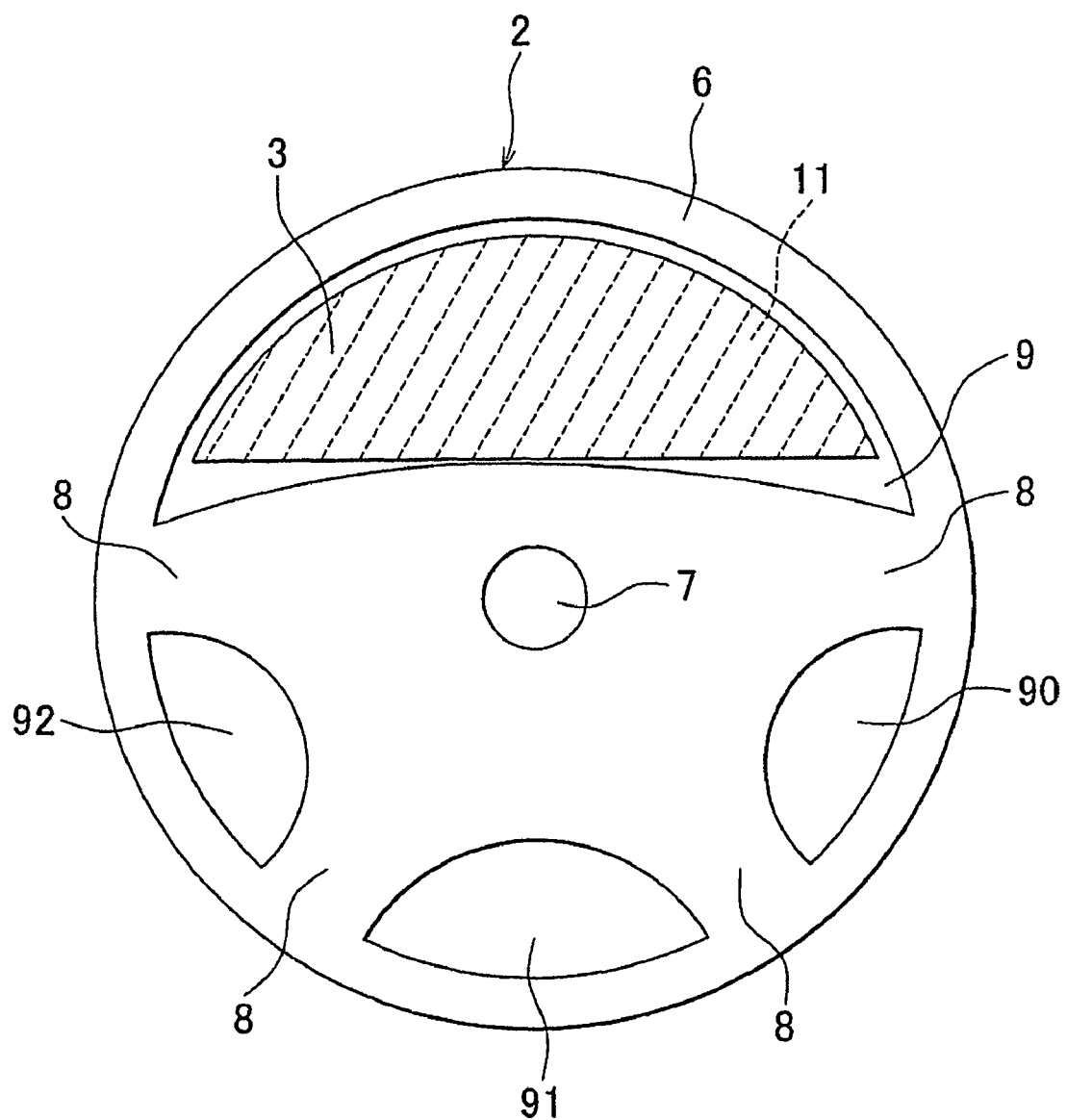
FIG. 10 is a view showing an example of a manner in which a meter display unit according to the second embodiment of the invention displays the important information when the steering angle of the steering wheel is 0°.
Figure 11:
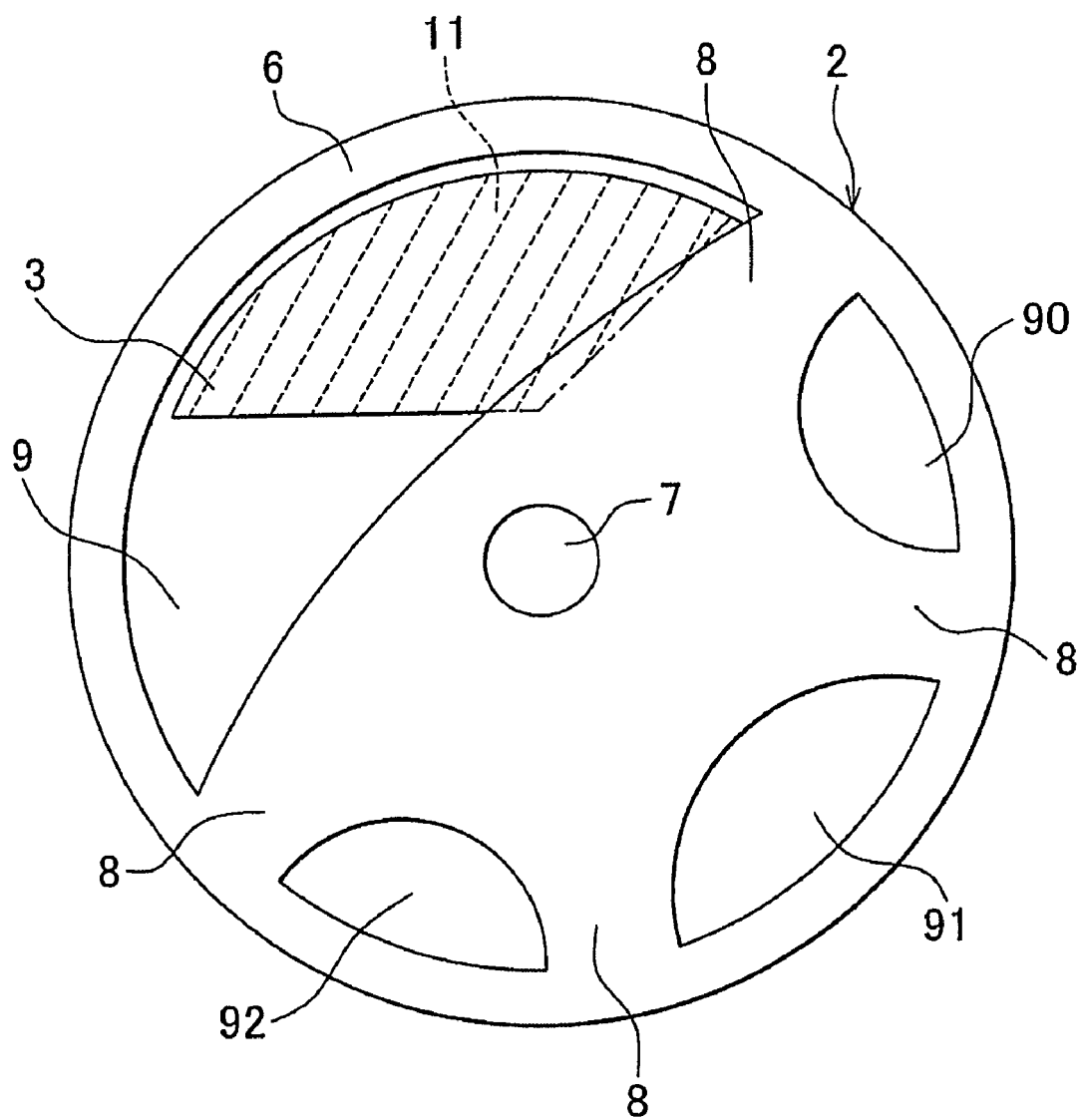
FIG. 11 is a view showing an example of the manner in which the meter display unit according to the second embodiment of the invention displays the important information when the steering angle of the steering wheel is −45°.
Figure 12:
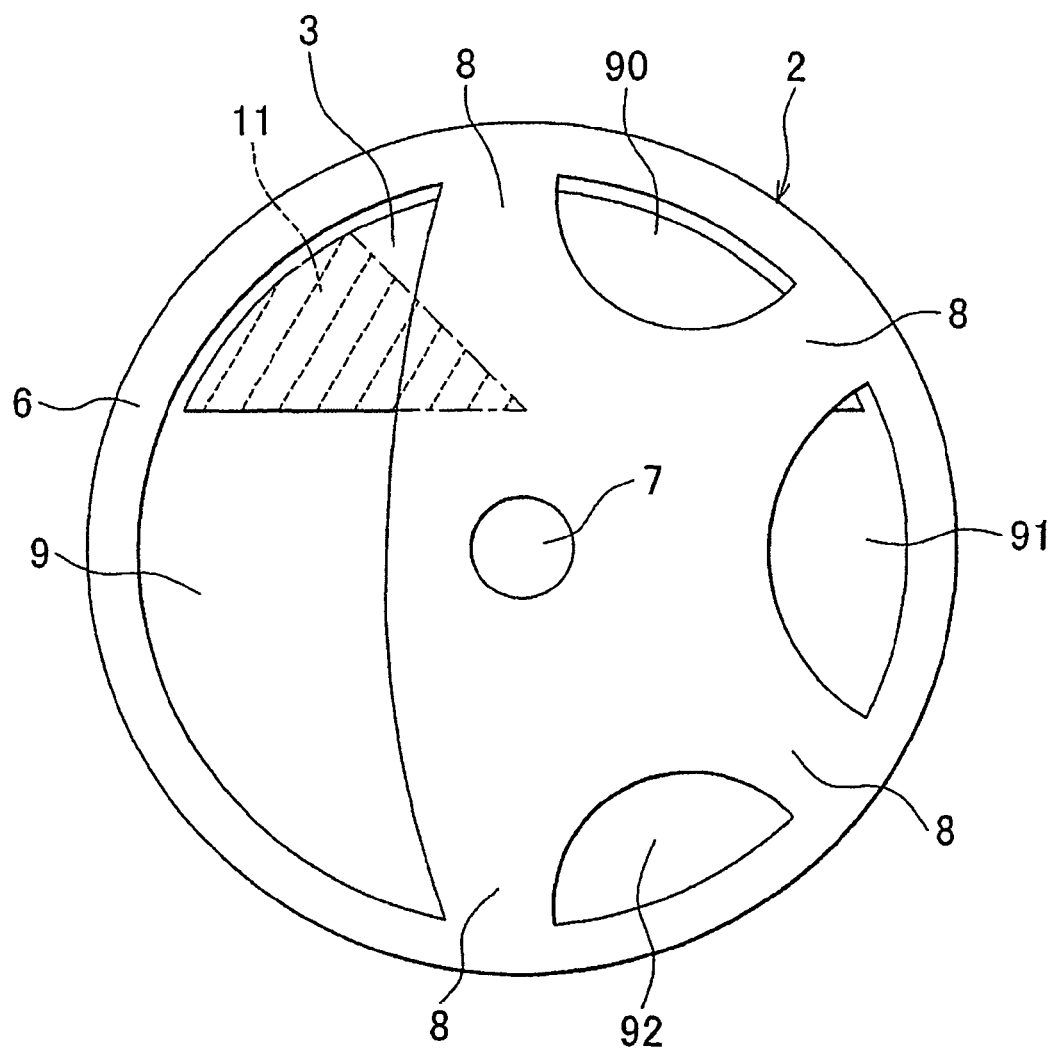
FIG. 12 is a view showing an example of the manner in which the meter display unit according to the second embodiment of the invention displays the important information when the steering angle of the steering wheel is −90°.

Next, examples of a manner in which the meter display unit 3 displays the important information will be described. FIG. 10 is a view showing an example of a manner in which the meter display unit 3 according to the second embodiment of the invention displays the important information when the steering angle of the steering wheel is 0°. FIG. 11 is a view showing an example of the manner in which the meter display unit according to the second embodiment of the invention displays the important information when the steering angle of the steering wheel is −45°. FIG. 12 is a view showing an example of the manner in which the meter display unit according to the second embodiment of the invention displays the important information when the steering angle of the steering wheel is −90°.

As shown in FIG. 10, when the steering angle θ is 0°, the meter display unit 3 displays the important information in a manner suitable for the straight mode. In the straight mode, the meter display unit 3 is controlled so that the driver can see the important information through the opening 9 of the steering wheel 2 the steering angle θ of which is currently 0°. In the straight mode, the entire screen of the meter display unit 3 is used as the important information display area 11 (the area indicated by the dotted lines in FIG. 10) so that the important information is displayed at a desired location on the entire screen and in a desired size. In the straight mode, multiple types of the important information, such as the warning information and the speed information, are displayed at the same time.

As shown in FIGS. 11 and 12, when the driver turns the steering wheel 2 and therefore the steering angle θ becomes a positive value or a negative value (the steering angle θ is −45° in FIG. 5; the steering angle θ is −90° in FIG. 6), the meter display unit 3 displays the important information in a manner suitable for the steering mode. In the steering mode, the area of the important information display area 11 is adjusted continuously or in a stepwise manner based on the steering angle θ so that the driver can see the important information through the opening 9 of the steering wheel 2 the steering angle θ of which is currently a positive value or a negative value.

When the steering angle θ is −45° as shown in FIG. 11, the important information is displayed, for example, on the left-side three-quarter segment of the entire screen of the meter display unit 3. In other words, the area of the important information display area 11 is reduced to three-quarters of the area used in the straight mode. Therefore, even when the steering angle θ is −45°, the driver can see substantially the entire area of the important information display area 11 through the opening 9.

When the steering angle θ is −90° as shown in FIG. 12, the important information is displayed, for example, on the left-side one-quarter segment of the entire screen of the meter display unit 3. In other words, the area of the important information display area 11 is reduced to one-quarter of the area used in the straight mode. Therefore, even when the steering angle θ is −90°, the driver can see substantially the entire area of the important information display area 11 through the opening 9. When the driver turns the steering wheel 2 to decrease the steering angle θ after turning the steering wheel 2 to increase the steering angle θ, the meter display unit 3 enlarges the important information display area 11 so that the driver can more easily see the important information displayed in the important information display area 11 through the opening 9.

As described above, the vehicle meter display system 10 according to the second embodiment of the invention reduces the important information display area 11 of the meter display unit 3 based on the steering angle θ of the steering wheel 2. Therefore, even if the steering angle θ is changed, the spokes 8 do not obstruct the driver's view of the important information displayed on the meter display unit 3. This makes it possible for the driver to always see the important information, such as warning information, through the opening 9. Accordingly, the driver can reliably obtain the important information, and drive the vehicle based on the obtained information.

In the second embodiment of the invention, the meter display control unit 50 may control the meter display unit 3 so that the number of objects of the important information displayed on the meter display unit 3 is reduced as the steering angle θ is increased. For example, when the steering angle θ is 0°, the meter display unit 3 may display both the warning information and vehicle speed information as the important information. When the steering angle θ is 90°, the meter display unit 3 may display only the warning information as the important information.

In this case, the number of objects of the important information displayed on the meter display unit 3 is reduced as the steering angle θ is increased. Therefore, even when the important information display area 11 of the meter display unit 3 is reduced as the steering angle θ is increased, the display area per one object of the important information can be maintained large enough for the driver to see and understand the information easily. Therefore, such reduction in the important information display area 11 does not reduce the ease in seeing the important information.

Further, in the second embodiment of the invention, the meter display control unit 50 may control the meter display unit 3 to display, as the important information, the vehicle speed in an analog format when the steering angle θ is equal to or larger than 0° and equal to or smaller than a predetermined angle, and may control the meter display unit 3 to display, as the important information, the vehicle speed in a digital format when the steering angle θ exceeds the predetermined angle.

The area in which the vehicle speed is displayed is smaller when the vehicle speed is displayed in the digital format than when it is displayed in the analog format. Hence, if the meter display control unit 50 executes a control for changing the vehicle speed display format from the analog format to the digital format when the steering angle exceeds the predetermined angle, the vehicle meter display system 10 produces the following effects. Even if the visible area on the screen of the meter display unit 3, which can be seen from the driver through the opening 9, is reduced as the steering angle θ is increased, the driver can see the vehicle speed displayed in the digital format through the opening 9. Therefore, the driver can reliably obtain the vehicle speed, and drive the vehicle based on the obtained vehicle speed.

The invention may be implemented as a vehicle meter display system that appropriately displays the vehicle information, which includes the important information such as the warning information. Further, the invention may be applied to a vehicle that includes a meter display unit which adjusts the location at which the vehicle information is displayed.

While the invention has been described with reference to example embodiments thereof, it is to be understood that the invention is not limited to the described embodiments or constructions. On the other hand, the invention is intended to cover various modifications and equivalent arrangements. In addition, while the various elements of the disclosed invention are shown in various example combinations and configurations, other combinations and configurations, including more, less or only a single element, are also within the scope of the appended claims.

What is claimed is:

1. A vehicle meter display system that displays vehicle information including important information, the vehicle meter display system comprising:
    a steering wheel that includes a rim, a boss connected to a steering shaft, and multiple spokes which connect the rim to the boss, and that has at least one opening formed between the spokes;
    a meter display unit disposed at a position closer to a front of the vehicle than the steering wheel;
    a steering angle detection unit that detects a steering angle of the steering wheel; and
    a meter display control unit that is configured to change a location on the meter display unit of an important information display area in which the important information is displayed based on the steering angle detected by the steering angle detection unit from a first position to a second position so that a driver of the vehicle is able to see the important information through the at least one opening.

2. The vehicle meter display system according to claim 1, wherein the meter display control unit changes an area of the important information display area based on the steering angle detected by the steering angle detection unit.

3. The vehicle meter display system according to claim 2, wherein the meter display control unit reduces the area of the important information display area continuously or in a stepwise manner as the steering angle is increased, and increases the area of the important information display area continuously or in a stepwise manner as the steering angle is decreased.

4. The vehicle meter display system according to claim 2, wherein the meter display control unit reduces the number of objects of the important information displayed on the meter display unit as the steering angle is increased.

5. The vehicle meter display system according to claim 1, wherein:
    two or more openings are formed between the spokes; and
    the important information is displayed in the important information display area in a manner selected based on the steering angle so that the important information is visible through one or more of the openings.

6. The vehicle meter display system according to claim 1, wherein the important information includes at least one of warning information issued to the driver and vehicle speed information.

7. The vehicle meter display system according to claim 1, wherein:
    the meter display control unit controls the meter display unit to display a vehicle speed as the important information in an analog format when the steering angle is equal to or lower than a predetermined angle; and
    the meter display control unit controls the meter display unit to display the vehicle speed as the important information in a digital format when the steering angle exceeds the predetermined angle.

8. A method for controlling a vehicle meter display system including: a steering wheel that includes a rim, a boss connected to a steering shaft, and multiple spokes which connect the rim to the boss, and that has at least one opening formed between the spokes; and a meter display unit disposed at a position closer to a front of the vehicle than the steering wheel, the method comprising:
    detecting a steering angle of the steering wheel; and
    changing location on the meter display unit of an important information display area in which important information is displayed based on the steering angle from a first position to a second position so that a driver of the vehicle is able to see the important information through the at least one opening.

9. The method according to claim 8, wherein the manner in which the important information display area is displayed is changed by calculating a target location for the important information display area, and moving the important information display area to the target location.

10. The method according to claim 8, wherein the manner in which the important information display area is displayed is changed by calculating a target area for the important information display area, and adjusting the area of the important information display area to the target area.

11. The method according to claim 8, wherein the manner in which the important information display area is displayed is changed by calculating a target area for the important information display area, and displaying the important information in the important information display area in a display format which is selected from among an analog format or a digital format based on the target area.

* * * * *